United States Patent
Büttner et al.

(10) Patent No.: US 9,287,754 B2
(45) Date of Patent: Mar. 15, 2016

(54) ELECTRICAL MACHINE HAVING DUAL-CIRCUIT COOLING

(71) Applicant: Siemens Aktiengesellschaft, München (DE)

(72) Inventors: Klaus Büttner, Hollstadt (DE); Klaus Kirchner, Ostheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 9 days.

(21) Appl. No.: 13/785,762

(22) Filed: Mar. 5, 2013

(65) Prior Publication Data

US 2013/0234543 A1     Sep. 12, 2013

(30) Foreign Application Priority Data

Mar. 8, 2012  (DE) .......................... 10 2012 203 695

(51) Int. Cl.
*H02K 9/197* (2006.01)
*B60L 3/00* (2006.01)
*B60L 11/18* (2006.01)

(52) U.S. Cl.
CPC .............. *H02K 9/197* (2013.01); *B60L 3/0061* (2013.01); *B60L 11/1803* (2013.01); *B60L 2220/12* (2013.01); *B60L 2240/36* (2013.01); *B60L 2240/425* (2013.01); *Y02E 10/725* (2013.01)

(58) Field of Classification Search
CPC ............ H02K 9/19; H02K 9/197; H02K 5/20
USPC ......................................... 310/54, 58, 59, 63
See application file for complete search history.

(56) References Cited

U.S. PATENT DOCUMENTS

| | | | |
|---|---|---|---|
| 6,544,020 B1 | 4/2003 | Bahnen et al. | |
| 2003/0193256 A1* | 10/2003 | Liebermann | 310/194 |
| 2007/0096588 A1 | 5/2007 | Kirchner | |
| 2007/0144192 A1* | 6/2007 | Kidwell | 62/209 |
| 2008/0024020 A1* | 1/2008 | Iund et al. | 310/61 |
| 2008/0272661 A1* | 11/2008 | Zhou et al. | 310/61 |
| 2009/0224715 A1* | 9/2009 | Smith | 318/471 |
| 2010/0252643 A1* | 10/2010 | Hug et al. | 236/93 R |
| 2011/0308071 A1* | 12/2011 | Baumann et al. | 29/598 |
| 2011/0316380 A1 | 12/2011 | Büttner et al. | |
| 2012/0133236 A1 | 5/2012 | Büttner et al. | |
| 2012/0169158 A1 | 7/2012 | Büttner et al. | |
| 2012/0187796 A1 | 7/2012 | Büttner et al. | |
| 2012/0205996 A1 | 8/2012 | Büttner et al. | |
| 2013/0175892 A1 | 7/2013 | Büttner et al. | |

FOREIGN PATENT DOCUMENTS

| | | |
|---|---|---|
| DE | 19745616 A1 | 4/1999 |
| DE | 102010033942 A1 | 12/2011 |
| EP | 0764358 B1 | 11/1998 |

\* cited by examiner

*Primary Examiner* — Terrance Kenerly
(74) *Attorney, Agent, or Firm* — Henry M. Feiereisen LLC

(57) ABSTRACT

An electrical machine includes a stator and a rotor which is pivotally mounted about an axis of rotation and interacts magnetically with the stator during operation of the electrical machine. The rotor has a rotor cooling system for cooling the rotor using a first coolant flow, and the stator is cooled by a stator cooling system using a second coolant flow.

18 Claims, 2 Drawing Sheets

ELECTRICAL MACHINE HAVING DUAL-CIRCUIT COOLING

CROSS-REFERENCES TO RELATED APPLICATIONS

This application claims the priority of German Patent Application, Serial No. 10 2012 203 695.4, filed Mar. 8, 2012, pursuant to 35 U.S.C. 119(a)-(d), the content of which is incorporated herein by reference in its entirety as if fully set forth herein.

BACKGROUND OF THE INVENTION

The present invention relates to an electrical machine, in particular an asynchronous machine, and to a cooling system for cooling an electrical machine or a vehicle, in particular a motor vehicle incorporating an electrical machine, and to a method for cooling an electrical machine.

The following discussion of related art is provided to assist the reader in understanding the advantages of the invention, and is not to be construed as an admission that this related art is prior art to this invention.

An electrical machine is used to convert electrical energy into mechanical energy and vice versa. When converting mechanical energy into electrical energy, the electrical machine is operated as a generator. When converting electrical energy into mechanical energy, the electrical machine is used as a motor. In both cases it is desirable to achieve a high degree of efficiency at high power density. High efficiency is necessary in order to enable energy to be provided inexpensively and in a resource-conserving manner. A high power density is necessary, as it is desirable to produce electrical machines more inexpensively and with less material usage, or to construct lightweight electrical machines for weight-sensitive applications.

Examples of weight-sensitive applications are those in which the supporting structure for the electrical machine is costly or the electrical machine is transported from one location to another in the application. Two examples of weight-sensitive applications are wind turbines or electric vehicles.

It would be desirable and advantageous to provide an improved electrical machine to obviate prior art shortcomings and to attain an effective cooling.

SUMMARY OF THE INVENTION

According to one aspect of the present invention, an electrical machine includes a stator, a rotor pivotally mounted about an axis of rotation and interacting magnetically with the stator during operation of the electrical machine, with the rotor having a rotor cooling system for cooling the rotor using a first coolant flow, and a stator cooling system for cooling the stator using a second coolant flow.

According to another aspect of the present invention, a cooling system for an electrical machine having a stator and a rotor which is mounted for rotation about an axis and interacts magnetically with the stator during operation of the electrical machine, includes a rotor cooling system formed by a first cooling circuit for cooling the rotor using a first coolant flow, and a stator cooling system for cooling the stator using a second coolant flow.

According to still another aspect of the present invention, a vehicle includes an electrical machine having a stator and a rotor which is mounted for rotation about an axis and interacts magnetically with the stator during operation of the electrical machine, and a cooling system having a rotor cooling system formed by a first cooling circuit for cooling the rotor using a first coolant flow, and a stator cooling system for cooling the stator using a second coolant flow.

According to yet another aspect of the present invention, a method for cooling an electrical machine having a stator and a rotor pivotally mounted about an axis of rotation and interacting magnetically with the stator during operation of the electrical machine, includes cooling the rotor using a first coolant flow, and adjusting a flow rate of the first coolant flow for cooling the rotor in dependence of an operating state of the electrical machine.

An electrical machine according to the invention has a stator and a rotor which is pivoted about an axis of rotation. The rotor is mounted on a shaft. The shaft is rotatably mounted in the housing of the electrical machine by bearings. The bearings used can be e.g. sleeve or roller bearings. In the case of roller bearings, it is rotatably mounted via rolling elements which are disposed between an inner race and an outer race. The inner race is disposed on the shaft and the outer race is disposed in the housing of the electrical machine such that the shaft is rotatably mounted in the housing. In the case of a ball bearing, the rolling elements are balls, for example. Lubricants can be used to reduce friction between the inner race and the rolling element or the outer race and the rolling elements.

In the case of the sleeve bearing, the outer race rotates relative to the inner race. Lubricants can be used here to reduce the friction between outer and inner race.

During operation of the electrical machine, the rotor can be caused to rotate and mechanical energy is converted into electrical energy by the magnetic interaction between rotor and stator. The electrical energy can be removed from a stator winding by connecting an electrical load.

During operation of the electrical machine, electrical energy can also be supplied via a stator winding and converted into mechanical energy by the magnetic interaction between stator and rotor. This causes the rotor to rotate and at the shaft mechanical energy can be transmitted to a mechanical load in the form of a rotational movement.

In order to enable a mechanical interaction between stator and rotor to take place during operation of the electrical machine, the rotor has permanent magnets or a winding with which a magnetic field can be generated. The rotor winding can have a plurality of turns or, as in the case of an asynchronous motor, a single turn. The winding can be connected to an electrical circuit, or be short-circuited. An example of an electrical machine having a shorted winding on the rotor is a squirrel cage asynchronous machine, wherein the squirrel cage acts as a rotor. The stator can have a plurality of windings which are disposed circumferentially around the stator. A rotating magnetic field can be moved with the windings during operation of the electrical machine. If the electrical machine is used as a motor, i.e. to convert electrical energy into mechanical energy, the windings can be supplied with electrical energy in a phase-shifted manner and thus cause the rotor to rotate in a simple manner. The windings can be controlled by taking the electrical energy from a 3-phase AC system or a power converter. A converter allows the stator windings to be controlled with any phase offset and different frequencies of the electric currents or voltages, so that the rotational speed of the shaft can be varied during operation of the electrical machine.

The rotor can also have a plurality of windings if this is necessary for the magnetic interaction with the stator, or is necessary for startup of the electrical machine, for maintaining operation or for stopping an electrical machine.

When an electrical machine is used as a generator, same arrangements of windings can be used as for an electrical machine used as a motor.

In order to achieve efficient cooling of the electrical machine according to the invention, the electrical machine has a rotor cooling system for cooling the rotor using a first coolant flow and a stator cooling system for cooling the stator using a second coolant flow. Cooling of the rotating parts is achieved by the rotor cooling system and cooling of the stationary parts of the electrical machine is achieved by the stator cooling system. As a result, the stator cooling system is less affected, in particular directly, by waste heat of the rotor. Likewise, the rotor cooling system is less affected, in particular directly, by waste heat of the stator. Overall, a more efficient cooling of the electrical machine is achieved by providing a separate stator cooling system and a separate rotor cooling system.

The first coolant flow involves the first coolant. The second coolant flow involves the second coolant.

A gas can be used as the first coolant and/or second coolant. This enables a gas to be selected which has the specific chemical or physical properties that are advantageous for the electrical machine. The advantage can be, for example, that the gas guarantees the use of the electrical machine over a longer period.

It is also advantageous for air to be used as the first and/or second coolant, as the requirements for enclosure of the stator cooling system or rotor cooling system in respect of leak-tightness are less stringent because air generally has no damaging effect on the electrical machine or its environment. The stator cooling or rotor cooling can therefore be of simple design.

It is also advantageous for a liquid to be used as the first and/or second coolant, as it can dissipate a large amount of waste heat because of its high thermal capacity.

The rotor cooling system can be an open or closed system inside the electrical machine according to the invention. A closed system prevents any unwanted escape of the first coolant from the electrical machine or in a space between stator and rotor. Operation of the electrical machine is therefore unimpeded and there are defined conditions for the cooling of the electrical machine. Thus more efficient cooling is achieved.

The stator cooling system can be an open or closed system inside the electrical machine according to the invention.

Designing the stator cooling as an open system makes it possible, for example, for the second coolant to flow along the stator or along a component part of the electrical machine that is in thermally conductive contact with the stator, thereby cooling the stator. This provides more efficient cooling without any great design complexity.

Designing the stator cooling as a closed system avoids any undesirable escape of coolant from the electrical machine or in a space between stator and rotor. Operation of the electrical machine is therefore unimpeded and there are defined conditions for the cooling of the electrical machine. Thus more efficient cooling is achieved.

A cooling system according to the invention enables an electrical machine according to the invention to be cooled and thus has at least the advantages already stated in connection with the electrical machine according to the invention.

A cooling system according to the invention can have a closed first cooling circuit whereby the first coolant generally cannot leave the first cooling circuit. An exception to the rule is if the first cooling circuit needs to be opened for safety reasons or for repair or maintenance purposes. A safety reason may involve, for example, overpressure in the first cooling circuit which allows some of the first coolant to escape by opening a valve. A repair or maintenance purpose would be topping up or replacing the first coolant. The closed first cooling circuit has the advantage that more efficient cooling of the electrical machine is possible by having a defined quantity of first coolant and a defined flow path of the first coolant. The defined flow path can be e.g. through a hose which allows flexible installation. If rigid installation of the defined flow path is possible, a pipe can be used.

In order to cool down the first coolant, i.e. to enable re-absorption of the waste heat in or rotor cooling by the coolant, the cooling system can incorporate a heat exchanger.

A vehicle according to the invention has at least the advantages stated in connection with the electrical machine according to the invention.

A method according to the invention for cooling an electrical machine according to the invention has at least the advantages stated in connection with the electrical machine according to the invention.

According to another advantageous feature of the present invention, the rotor cooling system may have an inlet for the first coolant flow to enable a control of the rotor cooling system independently of the stator cooling system. The inlet enables the rotor to be cooled more strongly than the stator or, conversely, allows the stator to be cooled more strongly than the rotor depending on the operating state of the electrical machine. Therefore, only as much cooling power as the operating state of the electrical machine requires is applied for the stator and rotor cooling, resulting in more efficient cooling of the electrical machine.

Thus it is possible, for example, in the case of an acceleration process of the electrical machine, for the stator, in particular the winding or windings, to be cooled more strongly by a greater cooling power in the stator cooling system than in the rotor cooling system. Following the acceleration process, the cooling power of the rotor cooling system is increased in order to allow for its delayed heating due to the thermal inertia of the rotor.

In addition, it is advantageously possible, after shutdown of the electrical machine, to increase the cooling power of the rotor cooling system compared to the stator cooling system in order to avoid stressing the bearings because of heat build-up. The heat build-up is caused by the rotor no longer producing air movements once the electrical machine is switched off.

For a vehicle, the inlet to the rotor cooling system is advantageous since, because of an airstream, the cooling requirements are more heavily dependent on the operating state of the vehicle than in the case of a fixedly mounted electrical machine. A cooling airstream during movement of the vehicle can result in differential cooling of the stator and rotor. The inlet to the rotor cooling system thus allows cooling which takes the cooling effect of the airstream into account.

In the case of a vehicle, in particular a motor vehicle, more changes between the different operating states occur, with the different operating states generating widely differing amounts of waste heat. More operating state changes arise, for example, if a motor vehicle is in "stop-and-go" traffic. The inlet to the rotor cooling system results in more efficient cooling here than is possible with a cooling system which does not take into account, or takes less strongly into account, the different effects of the operating states of the vehicle, in particular a motor vehicle, on the rotor or stator waste heat produced.

Different coolants can be used for the first and second coolant. A liquid can be used as the first coolant for the rotor cooling system, and a gas or air as the second coolant for the stator cooling system, thereby achieving greater cooling power in the rotor. This is advantageous, for example, for asynchronous machines, as in these the rotor is heated more strongly than the stator during operation of the asynchronous machine.

An outlet of the rotor cooling system can also be connected to an inlet to the stator cooling system. The connection between rotor cooling system and stator cooling system can then have a branch via which the first coolant can be fed out or in, so that the rotor cooling system can be controlled independently of the stator cooling system.

According to another advantageous feature of the present invention, the rotor cooling system can have a guide assembly so that at least part of the rotor cooling system extends along a shaft of the electrical machine for support of the rotor. This enables the shaft to be cooled directly and limits any heating of the shaft compared to the other components of the electrical machine. Thus, differential expansion of the shaft with respect to the bearing or bearings or the housing of the electrical machine is reduced. Stresses between shaft and bearing or housing are therefore reduced. As a result of direct cooling of the shaft, temperature-sensitive components of the electrical machine in the vicinity of the shaft can be better protected from degradation of their properties. Thus, the bearing lubricant properties necessary for operation of the electrical machine are preserved over a longer period of time than would be the case without cooling of the shaft.

The rotor cooling system extends along the shaft such that the first coolant flow can unobstructedly remove the waste heat from the shaft. This means in particular that rotor components do not obstruct the first coolant flow. An obstruction to the first coolant flow could be, for example, the laminated core which extends radially from the shaft in the direction of the stator.

According to another advantageous feature of the present invention, at least part of the rotor cooling system is disposed in the shaft. The advantage of this is that the shaft is cooled directly and the rotor cooling system is not in an internal space between rotor and stator, which could impede operation of the electrical machine.

According to another advantageous feature of the present invention, the guide assembly of the rotor cooling system can have an axial bore in the shaft and an inflow element. The coolant can thus be guided in the axial bore. The first coolant is introduced in the rotor cooling system using the inflow element.

The inlet to the rotor cooling system is connected to the inflow element. The advantage of this is that the shaft is cooled before the other rotor components.

The outlet of the rotor cooling system is disposed on the shaft such that the coolant flows out of the axial bore to the outlet over a short distance. The advantage of this is that the shaft is cooled directly by the first coolant, and the rotor components are cooled via a thermally conductive connection to the shaft.

Thus an embodiment of an electrical machine according to the invention is advantageous wherein the electrical machine incorporates a space which is disposed at an open end of the shaft such that the first coolant flow can exit the axial bore into the space, and the space is delimited in the axial direction by an axial boundary which enables the first coolant flow to be guided spirally about the axis of rotation into the outlet of the rotor cooling system. The first coolant is swirled due to the rotation of the rotor during operation of the electrical machine. The swirl is advantageously utilized by the axial boundary in order to guide the first coolant flow along the axial boundary into the outlet of the rotor cooling system. Little or no energy is therefore necessary to enable the first coolant flow to pass through the electrical machine, in particular the rotor, thereby achieving more efficient cooling of the electrical machine.

The embodiment also provides efficient cooling for electrical machines that are operated in both directions of rotation about the rotational axis. In a given application, the electrical machine is generally operated for a greater proportion of time in one of the two directions of rotation. The axial boundary can be designed such that the axial boundary allows spiral guiding of the coolant, in particular of the cooling liquid, about the axis of rotation into a coolant outlet for the direction of rotation used for the greater proportion of the time.

In the axial direction, the axial boundary is on a side of the space opposite the axial bore in order to delimit the space there such that the first coolant flow cannot exit the space in the axial direction on the opposite side.

The coolant exit can be provided in a radial boundary of the space so that the axial boundary guides the first coolant flow with the assistance of the centrifugal force into the outlet of the rotor cooling system.

The outlet of the rotor cooling system can extend into the space through a cutout in a radial boundary of the space. Thus the first coolant flow can be guided through the axial boundary into the outlet of the rotor cooling system without the help of the centrifugal force.

In an advantageous embodiment of an electrical machine according to the invention, the inflow element is an admission tube. The advantage of this is that the first coolant flow can be guided to an end of the axial bore. The axial bore and the admission tube can advantageously extend far enough into the shaft along the axis of rotation to ensure that the rotor and its associated components and the bearings of the electrical machine that are disposed on the shaft are adequately cooled.

At the end of the axial bore, a diverting member can be advantageously disposed which diverts the first coolant flow exiting the admission tube such that it can flow in a hollow cylindrical space between admission tube and the axial bore to the rotor cooling system outlet.

The admission tube and the axial bore allow the first coolant to flow unimpeded, regardless of the operating state of the electrical machine. In particular, the first coolant can flow unimpeded even if the shaft of the electrical machine is at rest.

Even if the first coolant flow involves a liquid, no significant impeding of the first coolant flow is found with the shaft at rest. In addition, there is no perceptible increase in the resistance to the first coolant flow when the rotor speed is increased. Thus a low-output pump can be used to pump the first coolant flow and even additional coolant flows in extensive cooling circuits.

According to another advantageous feature of the invention, the electrical machine has a jacket which is disposed around the stator and which houses the stator cooling system for cooling the stator using a second coolant flow. The jacket is therefore designed such that it can absorb the waste heat of a stator winding or of a laminated core that is a constituent part of the stator and dissipate it via the stator cooling system, thus improving the efficient cooling of the electrical machine. The jacket can circumferentially enclose the stator disposed around the axis of rotation in order to enable the waste heat to be absorbed at every point on the stator's circumference. In addition, the jacket can extend along the entire stator in the direction of the axis of rotation, thereby enabling the waste heat to be absorbed by the jacket over the entire length of the stator along the axis of rotation.

The stator cooling system is arranged such that it can dissipate the waste heat of the stator via the thermally conductive properties of the jacket. Advantageously, the jacket can have ducts in which the second coolant can be guided. The ducts can be designed such that a coolant can only reach the ducts via inlets and leave them via outlets. The stator can thus be selectively cooled using a defined quantity of coolant, thereby achieving a further improvement in cooling efficiency. The ducts can be interconnected in order to feed the second coolant to the stator cooling system in a simple manner via an inlet to the stator cooling system and discharge it via an outlet of the stator cooling system.

Advantageously, the first cooling circuit can include a controller for controlling the rotor cooling system. The advantage of this is that the cooling can take place in an efficient manner and only the cooling power required for the rotor cooling system is provided. The controller of the first cooling circuit enables the flow rate through the first cooling circuit to be adjusted. The flow rate is the volume of coolant flowing through a cross section at a particular time. In the case of the flow rate in the first cooling circuit, the cross section can be e.g. the cross section of the inlet of the rotor cooling system through which the first coolant flow enters the rotor cooling system. Advantageously, the controller of the first cooling circuit has an element which can limit the first flow rate in the first cooling circuit as a function of a controlled variable. The element can be e.g. a solenoid valve.

In another advantageous embodiment of a cooling system according to the invention, the first cooling circuit comprises a pump. This pump pumps the first coolant through the first cooling circuit. As result of the pump causing the first coolant to flow in the first cooling circuit, rotor cooling can be performed even when the electrical machine is stopped, i.e. with the rotor at rest. The pump output is advantageously controllable. The advantage of this is that the energy consumption by the pump can be reduced if a lower pump output is sufficient for the rotor cooling system.

According to another advantageous feature of the present invention, the stator cooling system can be formed by a second cooling circuit. The advantage of this is that the rotor cooling system and stator cooling system can be operated independently of one another, enabling the electrical machine to be cooled efficiently.

Advantageously, the second cooling circuit can be a closed circuit so that the second coolant generally is unable to escape the second cooling circuit, as is the case for the first closed cooling circuit in an embodiment of the invention. The closed second cooling circuit has the advantage that more efficient cooling of the electrical machine is possible by having a defined quantity of second coolant and a defined flow path the second coolant. The defined flow path be e.g. through a hose which allows flexible installation. If fixed installation of the defined flow path is possible, pipework can be used.

Closed first and second cooling circuits provide more efficient cooling of the electrical machine.

Advantageously, the second cooling circuit may include a controller for controlling the stator cooling system. This enables the stator cooling to be controlled independently of the rotor cooling. The electrical machine can thus be cooled efficiently. The controller of the second cooling circuit can be of a same design as the controller of the first cooling circuit.

In another advantageous embodiment of a cooling system according to the invention, the second cooling circuit has another pump. The other pump enables the coolant to be pumped in the second cooling circuit. The other pump can be of the same design as the pump in the first circuit.

According to another advantageous feature of the present invention, the first and second cooling circuits can have a common section. The advantage of this is that only one location needs to be provided for filling the first cooling circuit and the second cooling circuit. In this case the same coolant is used for the first and the second coolant. It is also advantageous that the pump can be installed in the common section, so that only one pump needs to be present in the cooling system. This enables an electrical machine to be cooled efficiently.

The pump advantageously pumps the coolant in the common section with a flow rate that is sufficient for cooling the stator and the rotor.

The flow rate in the first cooling circuit can then be controlled independently by the controller of the first cooling circuit. Alternatively, the second cooling circuit can also be controlled independently by a controller in the second cooling circuit. A controller can also be present both in the first cooling circuit and in the second cooling circuit. This allows finer adjustment of the flow rate in the first cooling circuit and in the second cooling circuit.

Advantageously, the first cooling circuit can have a first temperature gauge. This advantageously enables the temperature of the first coolant in the first cooling circuit, i.e. for the rotor cooling system, to be measured and the flow rate of the first coolant in the first cooling circuit to be increased when the temperature exceeds a predefined value, or reduced when the temperature falls below another predefined value. A lower flow rate requires a lower pump output and therefore saves energy, thereby making the cooling system more efficient.

The first temperature gauge of the first cooling circuit can be advantageously disposed close to the outlet of the rotor cooling system in order to measure the temperature of the first coolant that has been heated by the waste heat of the rotor as it leaves the rotor cooling system.

Advantageously, the second cooling circuit can have a first temperature gauge. The first temperature gauge in the second cooling circuit enables the flow rate in the second cooling circuit to be controlled so that efficient stator cooling is achieved. If the second cooling circuit has another pump, this can produce more efficient cooling by means of the first temperature gauge in the second cooling circuit.

If a pump is provided in a common section of the first and second cooling circuit, this can provide effective cooling by means of the first temperature gauge in the first cooling circuit and/or second cooling circuit.

The first temperature gauge of the second cooling circuit can be advantageously disposed close to the outlet of the stator cooling system in order to measure the temperature of the second coolant that has been heated by the waste heat of the stator as it leaves the stator cooling system.

In another advantageous configuration of the cooling system, the first cooling circuit has a second temperature gauge. The second temperature gauge can advantageously measure a temperature of the first coolant before it flows into the rotor cooling system, i.e. upstream of the inlet of the rotor cooling system or even at or in the vicinity of the inlet to the rotor cooling system. The first temperature gauge in the first cooling circuit can advantageously measure the temperature at the outlet of the rotor cooling system. The electrical machine can be cooled even more efficiently using the first temperature gauge and the second temperature gauge. The first temperature gauge and the second temperature gauge of the first cooling circuit make it possible to evaluate, among other things, the amount of waste heat that is absorbed by the rotor cooling system and dissipated again to the environment of the electrical machine outside the rotor cooling system. It is therefore possible to perform an evaluation indicating what waste heat is absorbed by the rotor cooling system and dissipated again outside the rotor cooling system. This evaluation can be used to control the flow rate in the first cooling circuit, thus allowing more efficient cooling of the electrical machine.

Advantageously, the second cooling circuit can have a second temperature gauge. Having a first temperature gauge and a second temperature gauge in the second cooling circuit enables the electrical machine to be cooled more efficiently. The second temperature gauge can advantageously measure a temperature of the coolant upstream of, at or in the vicinity of an inlet to the stator cooling system, and the first temperature gauge of the second cooling circuit can advantageously measure a temperature of the coolant at an outlet of the stator cooling system. It is therefore possible to perform an evaluation indicating what waste heat is absorbed by the stator cooling system and dissipated again outside the stator cooling system. This evaluation can be used to control the flow rate in the second cooling circuit, thus allowing more efficient cooling of the electrical machine.

Advantageously, the first coolant may include water and an antifreeze, thereby achieving more efficient cooling because of the high thermal capacity of the first coolant. Thus, even at low temperatures, a low pump output is sufficient for pumping the first coolant, thereby enabling the electrical machine to be cooled more efficiently. An example of an antifreeze includes an antifreeze which prevents or minimizes corrosion of the cooling system, in particular in the electrical machine. Thus, in particular, the antifreeze can minimize or prevent corrosion of electrical machine components that are made of steel.

According to another advantageous feature of the present invention, a flow rate of the second coolant flow in the stator cooling system can be adjusted depending on the operating state of the electrical machine. This enables the stator to be cooled efficiently as a function of the operating state of the electrical machine. For example, for the different operating states of an acceleration process of the electrical machine, the flow rate of the second coolant flow in the stator cooling system can be initially increased so that the stator, in particular the stator windings, are cooled more strongly, and then the flow rate of the first coolant flow in the rotor cooling system can be increased in order to counteract the rotor heating which commences in an offset manner due to the rotor's thermal inertia. More efficient cooling of the electrical machine is therefore achieved by the method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
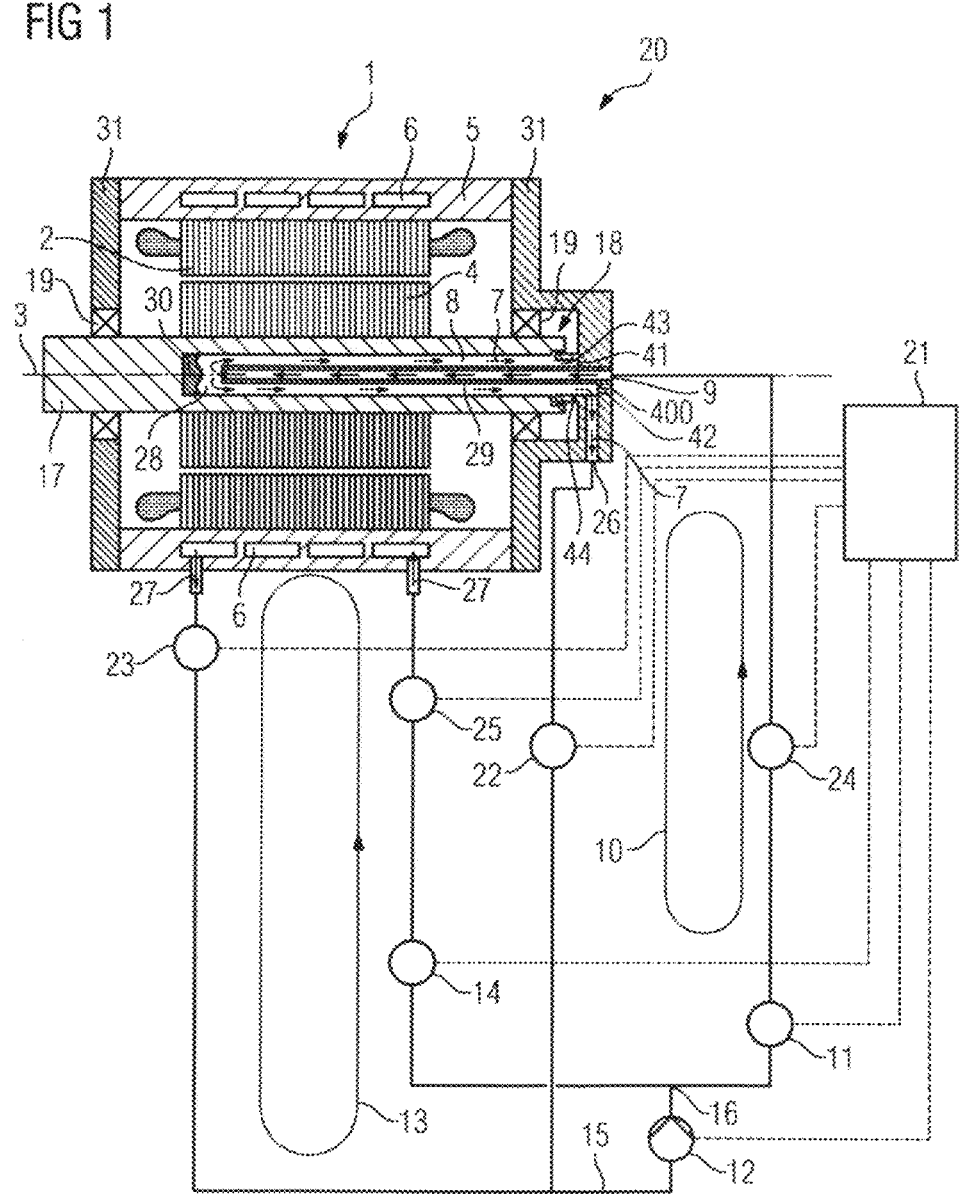
FIG. 1 is a schematic illustration of an electrical machine having incorporated a cooling system in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an electrical machine, generally designated by reference numeral 1 and having incorporated a cooling system generally designated by reference numeral 20 in accordance with the present invention. The cooling system 20 has a first cooling circuit 10 in which a first coolant flow 7 is pumped into the inlet 9 of a rotor cooling system 8 by a pump 12. The rotor cooling system 8 is in the shaft 17 and has a guide assembly 18. The guide assembly 18 has an inflow element 29 which guides the first coolant flow 7 from the inlet 9 of the rotor cooling system 8 to an end of an axial bore where the first coolant flow 7 is diverted by a diverting member 30. The first coolant flow 7 then flows in the axial bore to the outlet 26 of the rotor cooling system. The guide assembly 18 comprises the axial bore and the inflow element 29 which, as described and shown in FIG. 1, guide the first coolant flow 7 in the rotor cooling system 8.

FIG. 1 also shows, on the side opposite the axial bore, the axial boundary 400 which delimits a hollow cylindrical space 43 and which enables the first coolant flow 7 to be guided spirally about the axis of rotation 3 from the part 41 of the axial boundary 400 disposed axially close to the shaft 17 to the part 42 of the axial boundary 400 disposed axially distant from the shaft 17. The first coolant flow 7 is thus guided along the axial boundary 400 into the outlet 26 of the rotor cooling system 8.

The outlet 26 of the rotor cooling system 8 is placed in a radial boundary 44 of the hollow cylindrical space 43, so that the axial boundary 400 guides the first coolant flow 7, with the aid of centrifugal force, into the outlet 26 of the rotor cooling system 8.

The first coolant flow 7 leaves the electrical machine 1 via the outlet 26 of the rotor cooling system 8. From there the first coolant flow 7 passes through a flexible line to the pump 12. The temperature of said first coolant flow 7 leaving the outlet 26 is measured by a first temperature gauge 22 of the first cooling circuit 10. The temperature measured is forwarded to a control unit 21.

The pump 12 is located in a common section 15 of the first cooling circuit 10 and of a second cooling circuit 13. The pump 12 pumps the first coolant flow 7 and a second coolant flow 27 of the second cooling circuit 13 via a branch 16 to a controller 14 of the second cooling circuit 13 and to a controller 11 of the first cooling circuit 10.

The first coolant flow 7 and the second coolant flow 27 include a coolant of water and Glysantin G30® in the ratio 50:50.

From the controller 14 of the second cooling circuit 13, the second coolant flow 27 enters a stator cooling system 6. Prior to the entry of the second coolant flow 27 to the stator cooling system 6, the temperature of the second coolant flow 27 is measured using a second temperature gauge 25 of the second cooling circuit 13 and forwarded to the control unit 21.

The stator cooling system 6 has ducts which run in a jacket 5 and are interconnected. The jacket 5 encloses the stator 2 which is connected thereto in a non-rotating and thermally conductive manner.

A housing of the electrical machine 1 includes the jacket 5 and the bearing shields 31. A rotor 4 is mounted on the shaft 17 and pivots about the axis of rotation 3 via bearings 19 in the bearing shields 31.

The electrical machine 1 is an asynchronous machine, so that the rotor 4 is a squirrel cage rotor. In addition, the stator 2 has a plurality of windings in order to be able to generate a rotating magnetic field.

The second coolant flow 27 leaves the stator cooling system 6 via an outlet where a first temperature gauge 23 of the second cooling circuit 13 measures the temperature of the second coolant flow 27 and forwards it to the control unit 21. After the second coolant flow 27 has left the stator cooling system 6, it flows to the pump 12 in the common section 15.

The first coolant flow 7 passes from the branch 16, through the controller 11 of the first cooling circuit 10, to the inlet 9 of the rotor cooling system 8. Before the first coolant flow 7 enters the rotor cooling system 8, the temperature of the first coolant flow 7 is measured using a second temperature gauge 24 of the first cooling circuit 10 and forwarded to the control unit 21.

A particular first flow rate can be adjusted for the first coolant flow 7 using the controller 11 of the first cooling circuit 10. To set the flow rate, the controller 11 of the first cooling circuit 10 has a solenoid valve. The solenoid valve is controlled as a function of a signal from the control unit 21 and can reduce the first flow rate of the first cooling circuit 10, increase it or leave it unchanged.

The controller 14 of the second cooling circuit 13 enables a particular second flow rate of the second coolant flow 27 to be set by having a solenoid valve which is controlled as a function of a signal from the control unit 21. The second flow rate of the second coolant flow can therefore be reduced, increased or left at the same value by the controller 14 of the second cooling circuit 13.

The pump 12 is controlled by the control unit 21 such that, in the common section 15, at least a particular flow rate obtains with which it can be ensured that the first flow rate can be set in the first cooling circuit 10 and the second flow rate can be set in the second cooling circuit 13 for sufficient cooling of the electrical machine.

The stator cooling system 6 is a closed system, thereby preventing unwanted egress of a coolant of the second coolant flow 27 from the electrical machine 1 or in a space between stator 2 and rotor 4. During desired operation, the coolant of the second coolant flow 27 only leaves via the outlet leading to the first temperature gauge 23 of the second cooling circuit 13.

The rotor cooling system 8 is likewise a closed system, as the coolant of the first coolant flow 7 only leaves the rotor cooling system 8 via the outlet 26 during desired operation.

The first cooling circuit 10 and the second cooling circuit 13 are closed cooling circuits in which flexible lines are used to guide the first coolant flow 7 and the second coolant flow 27.

Figure 2:
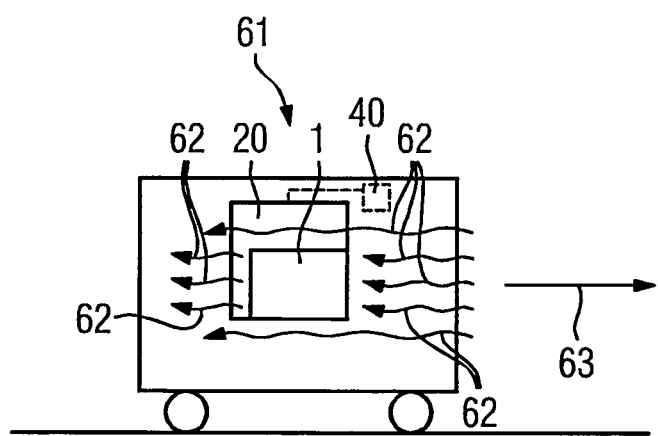
FIG. 2 is a schematic illustration a vehicle having incorporated therein an electrical machine with a cooling system in accordance with the present invention.

FIG. 2 shows an exemplary embodiment of a vehicle 61 according to the invention. The vehicle 61 is a motor vehicle and incorporates the electrical machine 1 and the cooling system 20 as shown in FIG. 1.

When the vehicle 61 is traveling at a first speed in a direction 63, the electrical machine 1 is cooled partly by an airstream 62. The electrical machine 1 is used to power the vehicle 61. The electrical machine 1 can accelerate the vehicle 61 or maintain its speed. The electrical machine 1 can also be used to decelerate the vehicle 61.

The different operating states of the electrical machine 1 the different operating states vehicle 61 produce differing amounts of waste heat at the rotor 4 and/or stator 2. The control unit 21 of the cooling system 20 receives information about the current operating state of the vehicle 61 from a central control unit 40. The first temperature gauge 23 of the second cooling circuit 13 and the first temperature gauge 22 of the first cooling circuit 10 provide the control unit 21 with information about the current operating state of the electrical machine 1, in particular about the current cooling requirement of the stator 2 and the rotor 4. The second temperature gauge 25 of the second cooling circuit 13 and the second temperature gauge 24 of the first cooling circuit 10 provide the control unit 21 with information as to the temperature of the first coolant flow 7 when it enters the rotor cooling system 8 and as to the temperature of the second coolant flow 27 when it enters the stator cooling system 6 respectively. The control unit 21 controls the pump 12, the controller 11 of the first cooling circuit 10 and the controller 14 of the second cooling circuit 13 using the four abovementioned temperature gauge and the information about the operating state of the vehicle 61 from the central control unit 40. As a result, the pump 12 pumps the first coolant flow 7 and the second coolant flow 27 through the first cooling circuit 10 and the second cooling circuit 13 according to the control information from the control unit 21. In this process, the controller 11 of the first cooling circuit 10 and the controller 14 of the second cooling circuit 13 are controlled according to the control information of the control unit 21 so that the desired first flow rate obtains in the first cooling circuit 10 and the desired second flow rate obtains in the second cooling circuit 13. The information about the operating state of the vehicle 61 which the control unit 21 receives from the central control unit 40 includes the speed and the current acceleration of the vehicle 61.

When the vehicle 61 is parked after a lengthy journey or is stationary in stop-and-go traffic or traveling at low speed, heat builds up in the electrical machine 1, as the rotor 4 no longer contributes, or only to a limited extent, to the dissipation of the waste heat by its rotational movement about the axis of rotation 3. Advantageously, the cooling system 20 can be cooled independently of the rotation of the rotor 4 about the axis of rotation 3. When the vehicle 61 is parked, the cooling system 20 can cause a first coolant flow 7 to continue to flow through the rotor cooling system 8, thereby cooling the rotor 4 via the shaft 3 of the electrical machine 1 while the vehicle 61 is parked. After the vehicle 61 has been parked, the shaft 3 produces strong waste heat which heats up and expands the inner races of the bearings 19. The jacket 5 and the bearing shields 31 may cool down faster, since in the case of the asynchronous machine the stator 2 is heated less strongly than the rotor 4. If the outer races of the bearings 19 cool down faster than the inner races of the bearings 19, this would result in damage to the bearings 19. The rotor cooling system 8 therefore ensures that the inner races of the bearings 19 do not heat up so strongly in the case of a parked vehicle 61.

Exemplary embodiments of a method for cooling an electrical machine 1 have been described in connection with the exemplary embodiment of the cooling system 20 of FIG. 1 and of the vehicle 61 of FIG. 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A cooling system for an electrical machine having a stator and a rotor which is mounted for rotation about an axis and interacts magnetically with the stator during operation of the electrical machine, said cooling system comprising:
   a rotor cooling system formed by a first cooling circuit for cooling the rotor using a first coolant flow;
   a first temperature gauge configured to measure a temperature in the first coolant flow as the first coolant flow exits an outlet of the rotor cooling system;
   a stator cooling system formed by a second cooling circuit for cooling the stator using a second coolant flow,
   wherein the rotor cooling system and stator cooling system form closed cooling systems, respectively, so as to enable a control of the rotor cooling system independently of the stator cooling system,
   wherein the first cooling circuit and the second cooling circuit have a common section;
   a pump located in the common section of the first and second cooling circuits; and
   at least one controller provided in at least one of the first and second cooling circuits.

2. The cooling system of claim 1, wherein the rotor cooling system has an inlet for the first coolant flow to enable the control of the rotor cooling system independently of the stator cooling system.

3. The cooling system of claim 2, wherein the rotor cooling system includes a second temperature gauge configured to measure a temperature in the first cooling circuit before the first coolant flow enters the inlet of the rotor cooling system.

4. The cooling system of claim 1, wherein the electrical machine has a shaft for support of the rotor, said rotor cooling system having a guide assembly to guide the first coolant flow in an axial bore of the shaft in one direction and back in an opposite direction.

5. The cooling system of claim 1, wherein the stator cooling system includes a temperature gauge configured to measure a temperature in the second coolant flow as the second coolant flow exits an outlet of the stator cooling system.

6. A vehicle, comprising:
   an electrical machine having a stator and a rotor which is mounted for rotation about an axis and interacts magnetically with the stator during operation of the electrical machine; and
   a cooling system having a rotor cooling system formed by a first cooling circuit for cooling the rotor using a first coolant flow, a first temperature gauge configured to measure a temperature in the first coolant flow as the first coolant flow exits an outlet of the rotor cooling system, and a stator cooling system for cooling the stator using a second coolant flow flowing in a second cooling circuit, wherein the rotor cooling system and stator cooling system form closed cooling systems, respectively, so as to enable a control of the rotor cooling system independently of the stator cooling system, wherein the first cooling circuit and the second cooling circuit have a common section, wherein a pump is located in the common section of the first and second cooling circuits, and wherein at least one controller is provided in at least one of the first and second cooling circuits.

7. The vehicle of claim 6, constructed in the form of a motor vehicle.

8. The vehicle of claim 6, wherein the rotor cooling system has an inlet for the first coolant flow to enable the control of the rotor cooling system independently of the stator cooling system.

9. The vehicle of claim 8, wherein the rotor cooling system includes a second temperature gauge configured to measure a temperature in the first cooling circuit before the first coolant flow enters the inlet of the rotor cooling system.

10. The vehicle of claim 6, wherein the cooling system has a controller disposed in the first cooling circuit for controlling the rotor cooling system.

11. The vehicle of claim 6, wherein the first cooling circuit and the second cooling circuit have a common section.

12. The vehicle of claim 6, wherein the electrical machine has a shaft for support of the rotor, said rotor cooling system having a guide assembly to guide the first coolant flow in an axial bore of the shaft in one direction and back in an opposite direction.

13. The vehicle of claim 6, wherein the stator cooling system includes a temperature gauge configured to measure a temperature in the second coolant flow as the second coolant flow exits an outlet of the stator cooling system.

14. A method for cooling an electrical machine having a stator and a rotor pivotally mounted about an axis of rotation and interacting magnetically with the stator during operation of the electrical machine, said method comprising:
   cooling the rotor by a rotor cooling system using a first coolant flow in a first cooling circuit;
   cooling a stator by a stator cooling system using a second coolant flow in a second cooling circuit;
   measuring a temperature in the first coolant flow by a first temperature gauge as the first coolant flow exits an outlet of the rotor cooling system;
   allowing a control of the rotor cooling system independently of the stator cooling system by forming the rotor cooling system and stator cooling system as closed cooling systems, respectively;
   adjusting a flow rate of the first coolant flow for cooling the rotor in dependence of an operating state of the electrical machine,
   providing a pump in a common section of the first cooling circuit and the second cooling circuit; and
   arranging at least one controller in at least one of the first and second cooling circuits.

15. The method of claim 14, further comprising adjusting a flow rate of the second coolant flow for cooling the stator in dependence of the operating state of the electrical machine.

16. The method of claim 14, further comprising constructing the rotor cooling system with a guide assembly to guide the first coolant flow in an axial bore of the shaft in one direction and back in an opposite direction.

17. The method of claim 14, further comprising measuring a temperature in the first cooling circuit by a second temperature gauge before the first coolant flow enters an inlet of the rotor cooling system.

18. The method of claim 14, further comprising measuring a temperature in the second coolant flow by a temperature gauge as the second coolant flow exits an outlet of the stator cooling system.

* * * * *